United States Patent
Gangadharan et al.

(10) Patent No.: US 7,882,483 B2
(45) Date of Patent: Feb. 1, 2011

(54) METHOD FOR CHECKING CONSTRAINTS EQUIVALENCE OF AN INTEGRATED CIRCUIT DESIGN

(75) Inventors: Sridhar Gangadharan, San Jose, CA (US); Manish Goel, Delhi (IN); Pratyush K. Prasoon, Noida (IN); Suraj Bharech, Noida (IN)

(73) Assignee: Atrenta, Inc., San Jose, CA (US)

( * ) Notice: Subject to any disclaimer, the term of this patent is extended or adjusted under 35 U.S.C. 154(b) by 62 days.

(21) Appl. No.: 11/755,764

(22) Filed: May 31, 2007

(65) Prior Publication Data

US 2008/0301598 A1 Dec. 4, 2008

(51) Int. Cl.
G06F 9/45 (2006.01)
G06F 17/50 (2006.01)

(52) U.S. Cl. .................................. 716/106; 716/107

(58) Field of Classification Search .................. 716/2, 716/5, 11
See application file for complete search history.

(56) References Cited

U.S. PATENT DOCUMENTS

| | | | |
|---|---|---|---|
| 6,842,884 B2 | 1/2005 | Lai et al. | |
| 7,039,883 B2 | 5/2006 | Krishnamurthy | |
| 7,134,106 B2 | 11/2006 | Huang et al. | |
| 2004/0103380 A1* | 5/2004 | Bohl et al. | 716/4 |
| 2005/0125757 A1* | 6/2005 | Krishnamurthy | 716/7 |
| 2006/0230373 A1* | 10/2006 | Dirks et al. | 716/6 |
| 2006/0271892 A1* | 11/2006 | Bohl et al. | 716/5 |
| 2007/0067746 A1* | 3/2007 | Baumgartner et al. | 716/5 |
| 2007/0220462 A1* | 9/2007 | Lindberg et al. | 716/5 |
| 2008/0126773 A1* | 5/2008 | Martinez et al. | 713/1 |
| 2008/0244491 A1* | 10/2008 | Ganesan et al. | 716/10 |
| 2008/0282212 A1* | 11/2008 | Dennison et al. | 716/10 |

OTHER PUBLICATIONS

Malavasi et al.; A Constraint Management System for IC Physical Design; Oct. 3, 1998; Inspec; Document ID: 10.1109/SBCCI.1998.715450; All pages.*

Madiraju et al.; "An Efficient Constraint Planning Algorithm for Multidatabases"; IEEE; 2005; All pages.*

* cited by examiner

*Primary Examiner*—Sun J Lin
*Assistant Examiner*—Suresh Memula
(74) *Attorney, Agent, or Firm*—Sughrue Mion, PLLC

(57) ABSTRACT

The equivalence of two or more constraint files of an integrated circuit (IC) design are checked. The comparison is performed between files at the same stage of design, files that correspond to different stages of the design flow, or between top-level and block-level constraint files.

28 Claims, 6 Drawing Sheets

METHOD FOR CHECKING CONSTRAINTS EQUIVALENCE OF AN INTEGRATED CIRCUIT DESIGN

TECHNICAL FIELD

The present invention relates generally to the design of integrated circuits (ICs), and more particularly to the checking of constraint equivalence in IC design. The following background materials will be helpful to an understanding of this material, and all are incorporated herein by reference for their useful background concerning the design of ICs: U.S. Pat. No. 6,842,884 to Lai, et al.; U.S. Pat. No. 7,039,883 to Krishnamurthy; and U.S. Pat. No. 7,134,106 to Huang, et al.

BACKGROUND OF THE INVENTION

State of the art electronic design automation (EDA) systems for designing complex integrated circuits (ICs) involves the use of several software tools for the creation and verification of designs of such circuits. Presently, EDA systems implement a design process commonly known as the top-down design methodology. This methodology is an iterative process that includes the processing steps of logic synthesis, floor-planning, place and route, and timing optimization.

The start point of a typical top-down design flow is a register transfer level (RTL) description of a circuit. The RTL description provides a functional view of an IC design expressed in a hardware description language (HDL). The RTL description is then converted, by logic synthesis tools, into detailed gate level netlists. The gate-level netlist is then used to create a floor-plan of the circuit. Thereafter, blocks are placed and routed by place-and-route tools to create the physical layout. The physical layout is optimized through a timing optimization process. To meet design goals the circuit designer defines various design constraints, such as the overall operating frequency of the IC, timing requirements, circuit area, power consumption, and the like. The constraints are used at various stages of the design process.

Generally, design constraints are defined by the circuit designer by means of an ASCII text file, such a Synopsys Design Constraints (SDC) file or Tcl. Typically, a constraints file includes timing assignment information which achieves the following: 1) describing the different attributes of clock signals, such as clock frequency, duty cycle, clock skew, and clock latency; 2) specifying input and output delay requirements of ports relative to a clock transition; and 3) setting timing exceptions. For example, a constraint can be defined using the following self-explanatory format:

set_max_delay 15.0-from [port A]-to [ports B]

The timing constraints can be further generated by design tools used during the various stages of the design. For example, a synthesis tool determines the timing constraints based on statistical wire-load estimation models and pre-characterized cell libraries for the process technology to be used when physically implementing the IC.

In a typical IC design, constraint files are used and modified at various stages of the design. At each stage, the SDC files are cleaned up so as to make them more efficient and concise. In addition, when a designer completes a design stage and moves to the next stage, a new constraint file, that includes constraints that are more appropriate for the new design stage, is generated. Typically, the new file is created either manually by the designer or automatically by using a design tool. For example, a synthesis tool determines the timing constraints based on statistically based wire-load estimation models and cell libraries pre-characterized for the process technology to be used when physically implementing the IC.

To ensure a correct design, it is imperative to check whether a modified or new constraints file meets the design criteria. Currently, an automatic tool that checks for constraints equivalence does not exist in the EDA industry, and such checks are often performed manually by designers, a process which is both time consuming and error prone.

Therefore it would be advantageous to provide a solution for automatically checking for equivalence between two or more constraints files.

DETAILED DESCRIPTION OF THE INVENTION

An embodiment of the present invention provides a system and method for checking the equivalence of two or more constraints files of an integrated circuit (IC) design. The comparison is performed between files at the same stage of a design flow, or between files that correspond to different stages of a design flow, or between top-level and block-level constraint files. The constraint file may be in a format of SYNOPSIS design constraints (SDC) file, a MAGMA design constraints file, or the like.

Figure 1:
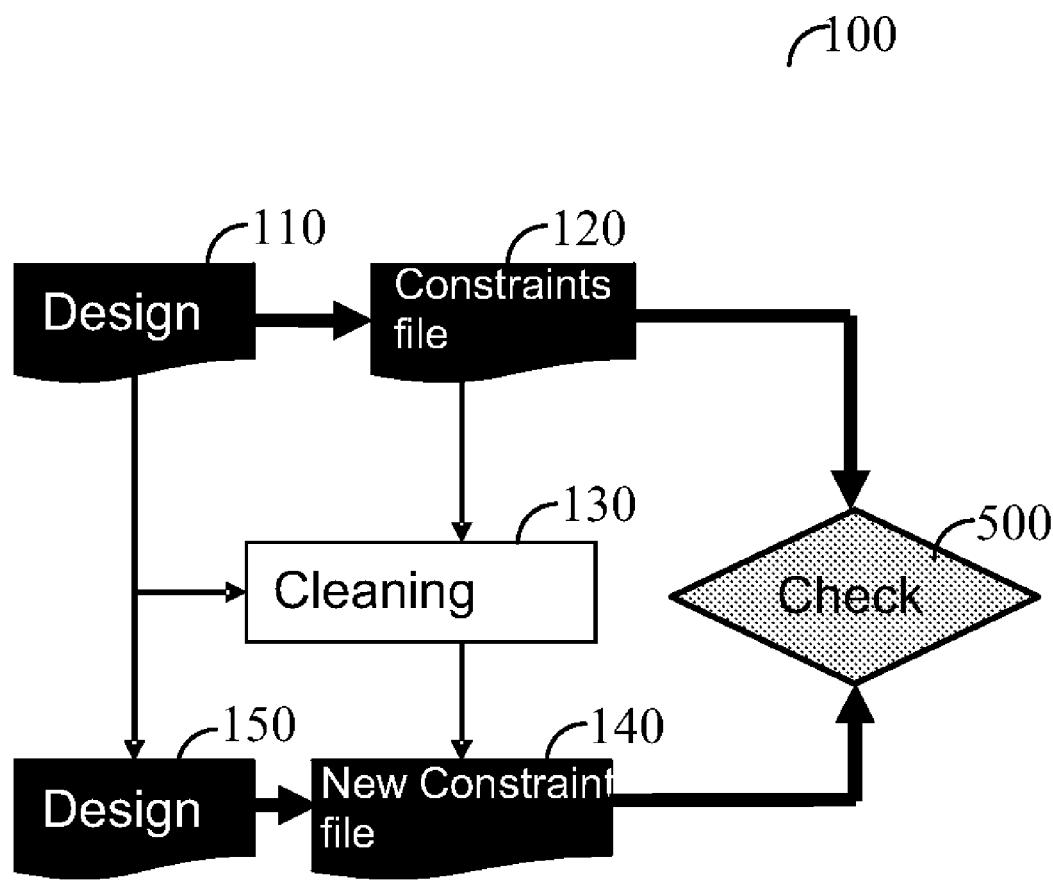
FIG. 1 is a diagram illustrating the equivalence checks of two constraints files used at the same stage of the design

FIG. 1 shows a non-limiting and exemplary diagram 100 illustrating the equivalence check of two constraint files, used at the same stage of the design, in accordance with an embodiment of the present invention. This type of check is performed once a designer modifies the constraints file. Such modifications can be performed at any stage of the design to make the design more efficient and concise. As shown in FIG. 1, a design file 110 uses a constraints file 120, which is modified through a cleanup process 130 to create a new constraints file 140. The design file 150 uses the new constraints file 140. The cleanup process 130 includes removing duplicate or overwritten exceptions, removing constraints that are not applicable or are redundant, removing disable_timing instances and replacing them with false_path, clustering constraints that are similar, e.g., expanded constraints may be replaced by wildcards, expanding wildcards to apply different constraints to each path, and so on. The design files 110 and 150 are used at the same stage of the design. The equivalence check process 500 assures that constraint files 120 and 140 are equivalent, i.e., that the new constraints file 140 retains the design criteria set in file 120. The equivalence check process 500 is described in greater detail below.

Figure 2:
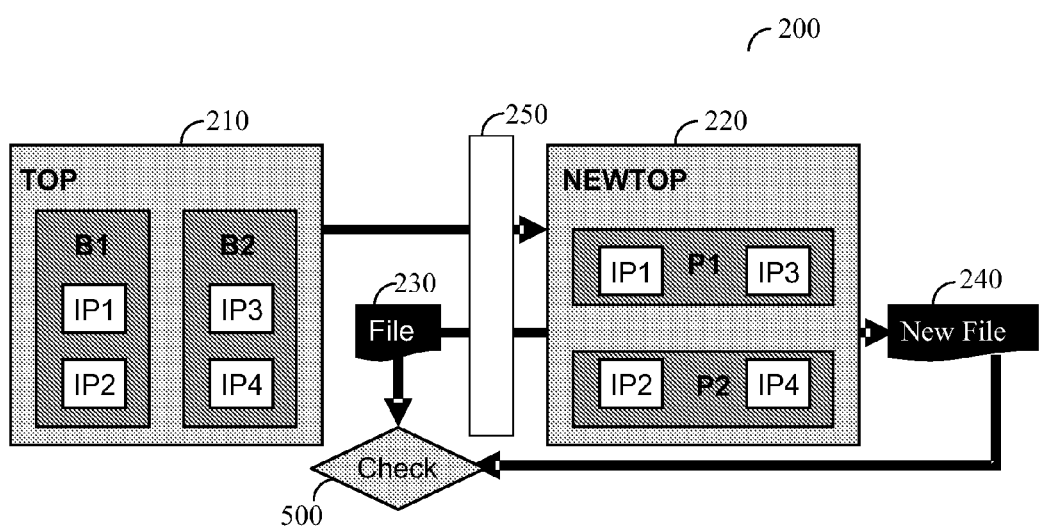
FIG. 2 is a diagram illustrating the equivalence checks of two constraints files modified by an implementation tool

FIG. 2 shows a non-limiting and exemplary diagram 200 illustrating the equivalence check of two constraint files modified by an implementation tool in accordance with an embodiment of the present invention. This type of check is performed when a physical implantation tool 250 (e.g., a router) reconstructs a netlist and a constraints file. The netlist 210 is reconstructed by an implementation tool 250 which generates a new netlist 220. The netlists 210 and 220 ought to be equivalent. The verification that netlists 210 and 220 are equivalent can be performed using a formal verification engine. The reconstruction of the netlist 220 also modifies the constraints file 230 and produces a new constraints file 240. In this case, the equivalence check process 500 assures constraints set on input, outputs, registers and intermediate points are equivalent. With this aim, the process 500 is provided, by the formal verification engine, with mapping information for equivalent points between the netlists 210 and 220.

Figure 3:
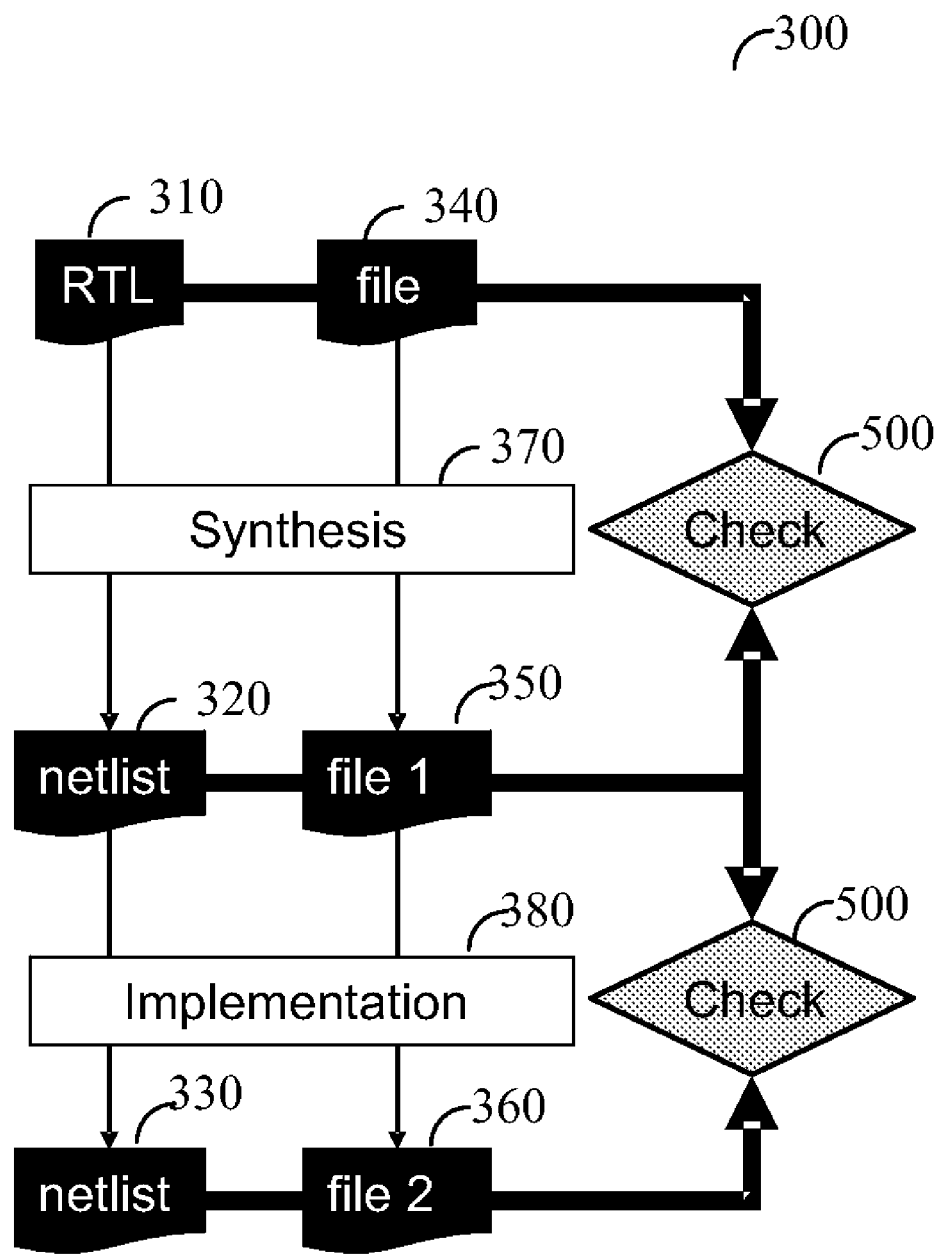
FIG. 3 is a diagram illustrating the equivalence checks of two constraints files used at different stages of the design

FIG. 3 shows a non-limiting and exemplary diagram 300 illustrating the equivalence checks of multiple constraint files at different stages of the design, in accordance with an embodiment of the present invention. Typically, such a check is performed in order to compare between constraint files used for logic design (pre-layout) and physical design (post-layout). In the diagram shown in FIG. 3, a RTL file 310 is synthesized to a gate-level netlist 320 by a synthesis tool 370. Then, netlist 320 is passed to a physical implementation tool 380 to create a layout of the design, which is represented as netlist 330. Three different constraint files 340, 350 and 360 are used, each of which is created during a different stage of the design flow. Specifically, the constraints file 340 is used for the RTL implementation and is typically defined by the user; file 350 is generated by synthesis tool 370 during logic synthesis; and, file 360 is generated using, for example, a static timing analyzer (STA) during the timing optimization. As netlists 320 and 330 are equivalent, there is a need to compare between constraint files 340 and 350 as well as between constraint files 350 and 360. This is performed by using the equivalence check process 500.

Figure 4A:
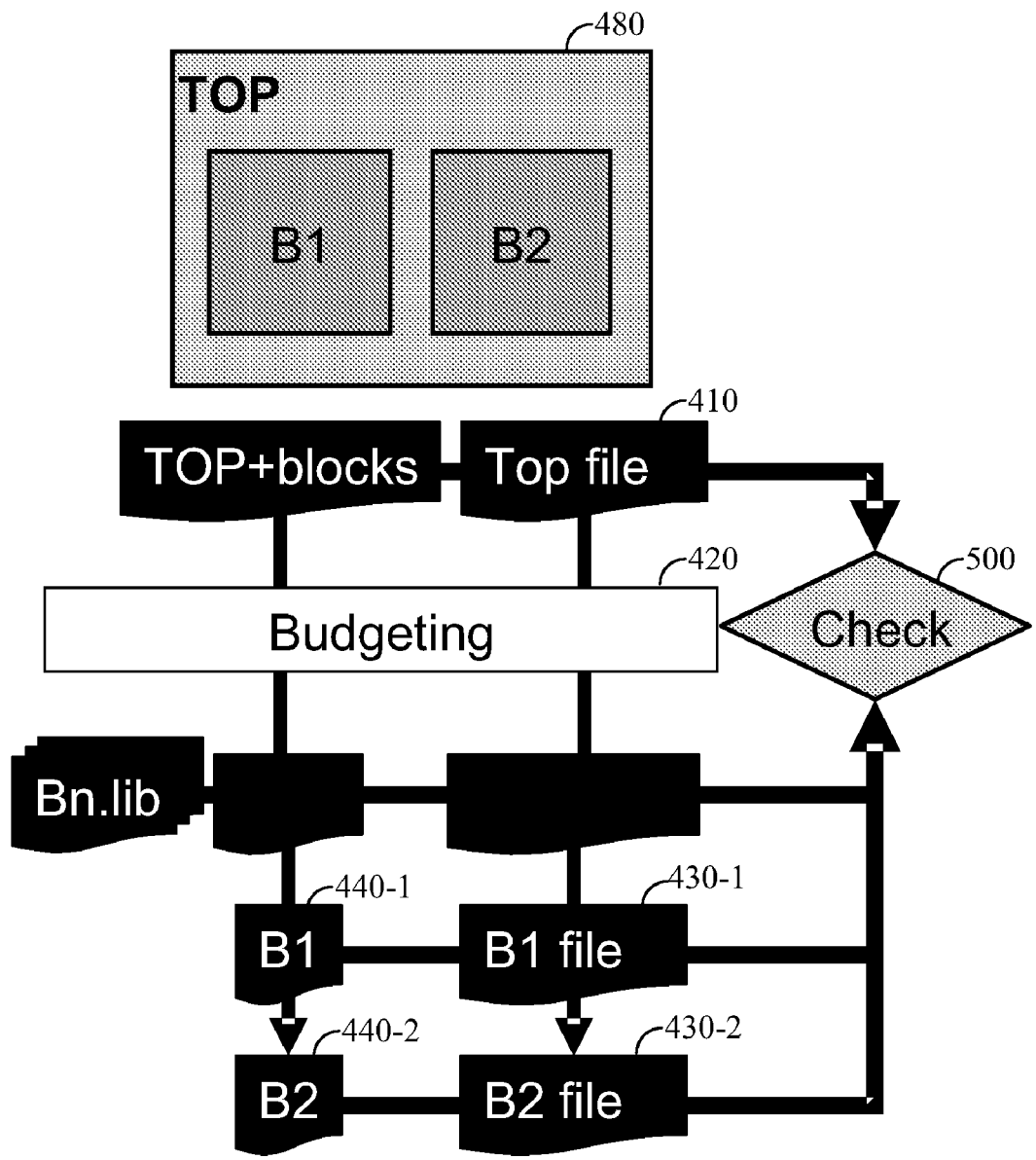
FIGS. 4A and 4B are diagrams for illustrating the equivalence checks between a block-level constraints file and a top-level constraint file
Figure 4B:
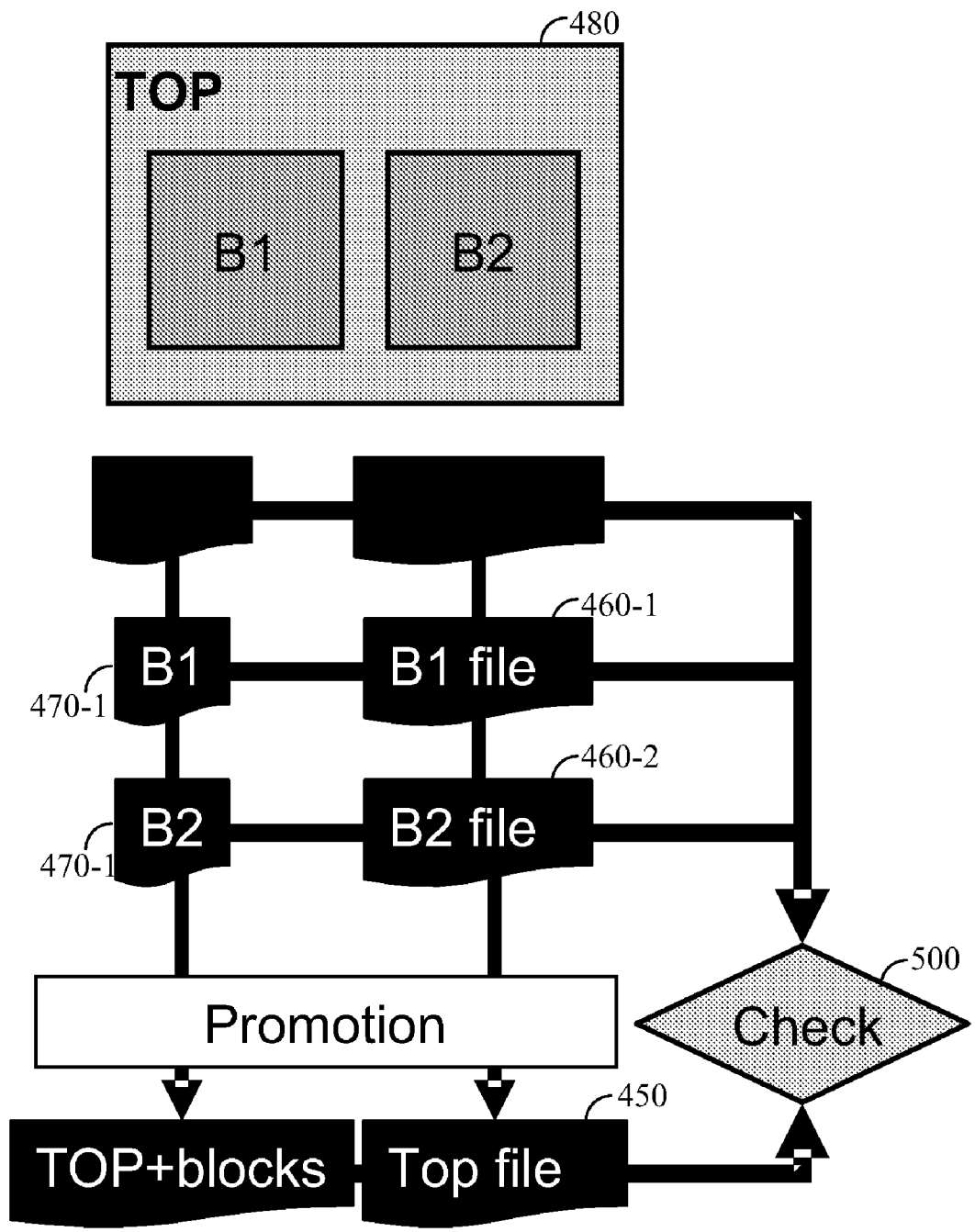

FIGS. 4A and 4B show a non-limiting and exemplary diagram illustrating the equivalence checks between a block-level constraints file and a top-level constraints file in accordance with an embodiment of the present invention. As depicted in FIG. 4A constraint file 410 constrains the entire design and constraint files 430-2 through 430-2 relate to design blocks 440-2 and 440-2. The files 430 are generated by a timing budgeting process 420. The equivalence check process 500 checks that block-level constraint files 430 are equivalent to top-level file 410. Additionally, as depicted in FIG. 4B the check process 500 can compare between a top-level constraint file 450 and block-level constraint files 460-1 and 460-2. With this aim, files 460 are merged prior to comparing to file 550. It should be noted that the check process 500 can a compare a plurality of block-level files to a top-level constraint file. The number of block-level constraint files 430 and 460 are as the number blocks of in a design 480 shown in FIGS. 4A and 4B.

Figure 5:
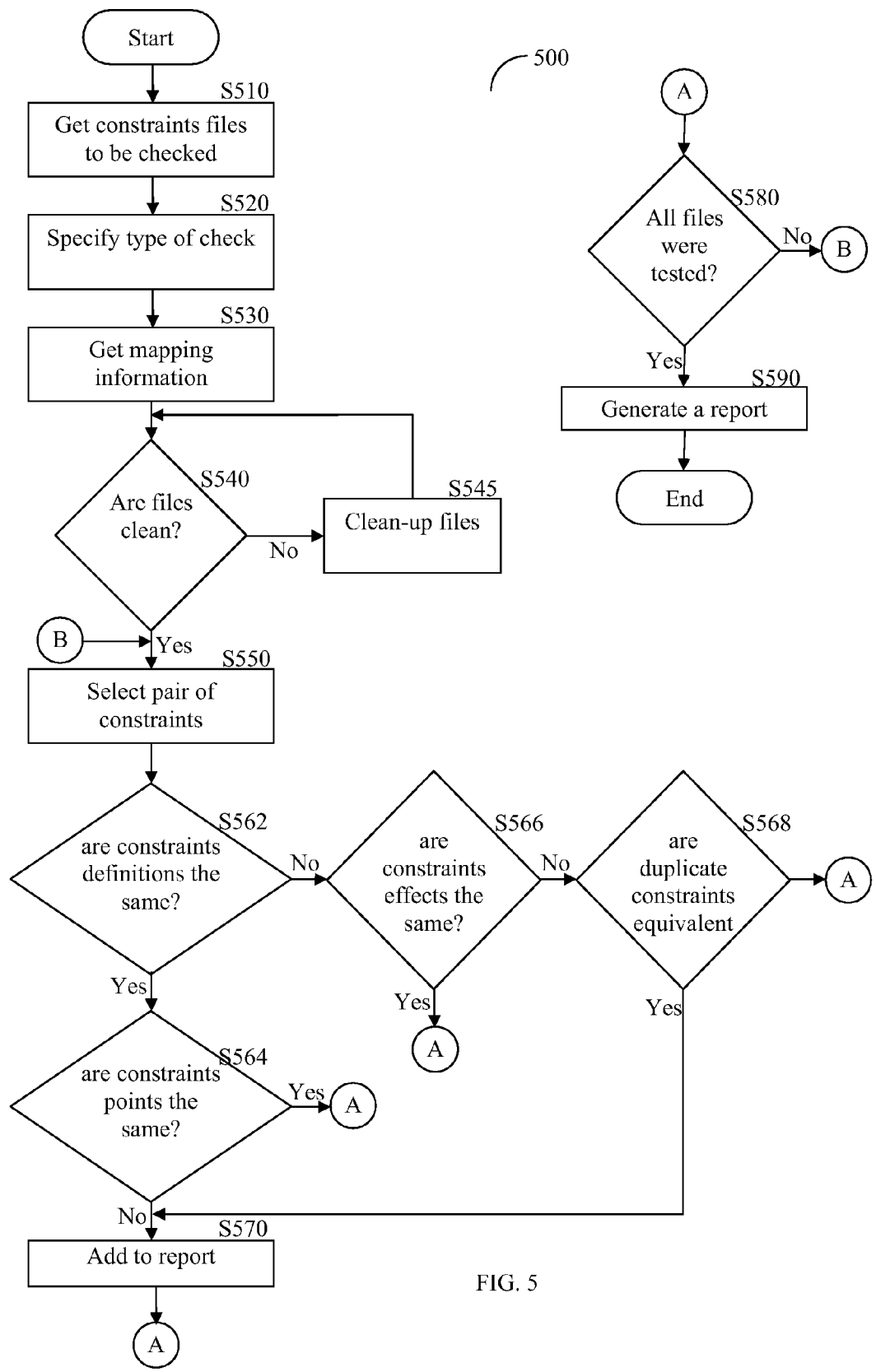
FIG. 5 is a flowchart describing the equivalence check process

FIG. 5 shows a non-limiting and exemplary flowchart 500 describing the equivalence check process 500 in accordance with an embodiment of the present invention. As demonstrated by the exemplary embodiments discussed above, the process 500 is the same regardless of the type of check that is being performed. Two constraint files are determined to be equivalent when all constraints and commands contained in the files are the same or result in the same effect.

The process 500 begins with S510 where two constraint files are received as an input. These files may be related to the same design or equivalent designs. At S520, the designer (user) may specify the type of check to be performed, e.g., one of the checks defined above. The user may further specify which section in the constraint files (i.e., type of constraints) have to be checked. This allows performing incremental equivalence checking of the files. For example, the designer might not be interested in detecting equivalence for the whole constraints file in one pass. Optionally, when the designer wishes to check constraint equivalence of different designs, mapping information of the different designs is received at S530. The mapping information is generated by a formal verification tool and includes name mapping of objects (pins, points, nets, and so on) in both designs.

At S540, a check is performed to determine if the constraint files are clean. A clean constraints file is free of syntax errors and does not include any overwritten or duplicate constraints. If S540 results with a negative answer (i.e., a determination of not clean), execution continues with S545, where a cleaning process is executed; otherwise, execution continues with S550. The cleaning process can be performed manually by the user or automatically by using a set of constraint rules.

At S550, the constraints are sequentially scanned and a pair of constraints from both files is selected. Specifically, first constraints in the files are ordered according to the their type and then they are paired for case analysis, clocks, input/output delays, exceptions, clock latency, clock uncertainty, input transition, output load, and so on. If no equivalent pair can be found, then constraints that could have the same effect are paired together, e.g. set_input_delay specified with respect to a virtual clock and set_max_delay set on the same path are selected as pairs. For each pair of constraints (commands or definitions) in both constraint files, a series of checks is performed to determine equivalency.

Specifically, at S562, it is checked if the selected pair of constraints has the same definition, and if so execution proceeds to S564; otherwise, execution continues with S566. At S564, it is determined whether the (connection) points in the pair of constraints are equivalent. Generally, each constraint being considered for equivalence, is applied on a path that has a start point, an end point, and one or more intermediate points. These points can be inputs, outputs, registers or intermediate points in the design. If the input points and/or the output points are not equivalent, execution continues with S570 where the selected pair is reported as having differing constraints; otherwise, execution continues with S580.

Execution reaches S566 to determine if the pair of constraints results in the same effect. For example, if a pure combinatorial path is constrained by using set_input_delay and set_output_delay with respect to a virtual clock in one constraints file and constrained using set_max_delay and set_min_delay in the second file, then if both of these commands results in same timing constraint, then they are determined to be equivalent. As another example, if a path is constrained using the constraint set_disable_timing in a first file and the constraint set_false_path in the second file, then both constraints are equivalent. Yet as another example, if the same constraint is set on an object (e.g. a pin) in the first file and set on an equivalent object (e.g. net connected to the pin) in the second file, then they are equivalent. If S566 results with a negative answer, execution continues with S568; otherwise, execution continues with S580.

At S568, an equivalence check for overwritten or duplicate constraints is performed. For example, a constraints file "A" includes the constraints:

create_clock -name CLK1 -period 10 [get_ports clka]
create_clock -name CLK2 -period 12 [get_ports clkb]
create_clock -name CLK3 -period 14 [get_ports clkc]

and a constraints file "B" includes the constraints:

create_clock -name C1 -period 10 [get_ports clka]
create_clock -name C2 -period 8 [get_ports clkb]
create_clock -name C3 -period 12 [get_ports clkb]
create_clock -name C4 -period 14 [get_ports clkc]

In this example, a definition of clock C2 (in file B) is not the same as the definition of clock CLK2 (in file B). However, clock C2 is overwritten by clock C3 (in file B) and clock C3 and clock CLK2 are equivalent, thus files A and B are considered equivalent. If it is determined that overwritten or duplicate constraints are not equivalent, execution continues with S570 where the differing constraints are reported; otherwise, execution continues with S580. At S580, it is checked if all commands and definitions in both constraint files were tested, and if so, execution proceeds with S590 where a report is generated; otherwise, execution returns to S550. The report preferably includes an indication of all pairs of different constraints and of constraints that are included only in one of the constraint files.

It should be noted that when comparing between a top-level constraints file and block-level constraints files, the latter are merged into a single file which is provided as an input to process 500. That is, the compression is performed between a top-level file and the merged file.

The invention disclosed in detail herein can be implemented in hardware, software, or combination thereof. The invention can be also implemented in a computer aided design (CAD) system or a CAD program and realized by operation of the system or program on a computer processor controlling a memory in which steps of the program are stored. The invention in the above-identified aspects may likewise be realized in a computer program product containing a plurality of instructions or commands, stored on a tangible computer readable medium, that when executed on a proper hardware such as a computer processor would result in the implementation of the methods disclosed herein.

It will be appreciated that the foregoing description has been made with respect to simplified examples, and that the inventive approach can be applied to more complex situations. Likewise, the report mentioned above may be generated in any number of different forms, with varying content, and at steps other than the precise step mentioned above.

It will be further appreciated that, as one example of a useful result that arises from the use of the inventive concepts described above, the checking of constraint equivalence in IC design can be realized in an automated system.

The invention is not limited to the foregoing embodiments, and those familiar with this field will be now equipped from the foregoing discussion to implement the invention in various other embodiments, without departing from the scope or spirit of the invention. To that end, the scope of the invention should be determined not from the concrete examples discussed, but from the claims appended below.

The invention claimed is:

1. A method for checking constraints equivalence of an integrated circuit (IC) design, comprising:
   receiving, via a computer device, a group of constraint files of the IC design, wherein the group of constraint files includes at least a first constraint file and a second constraint file, each constraint file containing a plurality of constraints;
   determining whether the first constraint file and the second constraint file are clean;
   selecting a pair of design constraints from the plurality of constraints, a first design constraint from the first constraint file and a second design constraint from the second constraint file; and
   for each pair of constraints, performing a plurality of checks to determine equivalency of the first design constraint to the second design constraint;
   wherein a constraint is defined to meet a design goal of the IC.

2. The method of claim 1, further comprising:
   specifying the type of equivalence check to be performed from the plurality of checks; and
   specifying sections in the first constraint file and the second constraint file to be checked.

3. The method of claim 2, wherein
   the first constraint file and the second constraint file are used at the same stage of the IC design.

4. The method of claim 2, wherein
   the second constraint file is generated by an implementation tool based on the first constraint file.

5. The method of claim 2, wherein
   the first constraint file and the second constraint file relate to different stages of the IC design.

6. The method of claim 5, wherein the checking for equivalence of the files relating to different stages of the IC design further comprises receiving mapping information, wherein the mapping information comprises name mapping of design objects.

7. The method of claim 2, wherein
   the first constraint file is a top-level constraint file the second constraint file and includes a plurality of block-level constraint files.

8. The method of claim 1, wherein determining whether the first constraint file and the second constraint file are clean further comprises performing a cleaning process when one or more of the first constraint file and the second constraint file are determined not to be clean.

9. The method of claim 8, wherein the cleaning process comprises:
   removing duplicate constraints; and
   removing overwritten constraints.

10. The method of claim 1, wherein the plurality of checks are performed after the first constraint file and the second constraint file are determined to be clean.

11. The method of claim 10, wherein the plurality of checks comprise:
    determining whether the pair of constraints has the same definition;
    determining whether connection points in the pair of constraints are equivalent; and
    determining whether the connection points are equivalent.

12. The method of claim 11, further comprises: when the pair of constraints is determined not to have the same definition, determining whether the pair of constraints results in the same effect.

13. The method of claim 12, further comprises:
    when the pair of constraints is determined not to have the same effect, determining whether the pair of constraints is one or more of: equivalent overwritten constraints and equivalent duplicate constraints; and
    when the pair of constraints is determined as not being duplicate or overwritten equivalent, reporting the pair of constraints as having differing constraints.

14. The method of claim 11, wherein upon determining that the connection points are not equivalent reporting the pair of constraints as being different constraints.

15. A computer program product for enabling a computer system to perform operations for an integrated circuit (IC) design method for checking constraints equivalence of an integrated circuit (IC) design, the computer program product having computer instructions on a tangible computer readable medium, that when executing on a computing hardware executes the operations comprising:
    receiving a group of constraint files of the IC design, wherein the group of constraint files includes at least a first constraint file and a second constraint file, each constraint file containing a plurality of constraints;

determining whether the first constraint file and the second constraint file are clean;

selecting a pair of design constraints from the plurality of constraints, a first design constraint from the first constraint file and a second design constraint from the second constraint file; and for each pair of constraints, performing a plurality of checks to determine equivalency of the first constraint to the second constraint;

wherein a constraint is defined to meet a design goal of the IC.

16. The computer program product of claim 15, further comprising:

specifying the type of equivalence check to be performed from the plurality of checks; and specifying sections in the first constraint file and the second constraint file to be checked.

17. The computer program product of claim 16, wherein wherein the first constraint file and the second constraint file are used at the same stage of the IC design.

18. The computer program product of claim 16, wherein the second constraint file is generated by an implementation tool based on the first constraint file.

19. The computer program product of claim 16, wherein the first constraint file and the second constraint file are related to different stages of the IC design.

20. The computer program product of claim 19, wherein the checking for equivalence of the files related to the different stages of the IC design further comprises receiving mapping information, wherein the mapping information comprises name mapping of design objects.

21. The computer program product of claim 16, wherein the first constraint file is a top-level constraint file and the second constraint file includes a plurality of block-level constraint files.

22. The computer program product of claim 15, wherein determining whether the first constraint file and the second constraint file are clean further comprises: performing a cleaning process when one or more of the first constraint file and the second constraint file are determined not to be clean.

23. The computer program product of claim 22, wherein the cleaning process comprises:

removing duplicate constraints; and removing overwritten constraints.

24. The computer program product of claim 15, wherein the plurality of checks are performed when the first constraint file and the second constraint file are determined to be clean.

25. The computer program product of claim 24, wherein the plurality of checks comprise:

determining whether the pair of constraints has the same definition;

determining whether connection points in the pair of constraints are equivalent; and determining whether the connection points are equivalent.

26. The computer program product of claim 25, further comprises: when the pair of constraints is determined not to have the same definition, determining whether the pair of constraints results in the same effect.

27. The computer program product of claim 26, further comprises:

when the pair of constraints is determined not to have the same effect, determining whether the pair of constraints is one or more of: equivalent overwritten constraints and equivalent duplicate constraints; and when the pair of constraints is determined as not being duplicate or overwritten equivalent, reporting the pair of constraints as having differing constraints.

28. The computer program product of claim 25, wherein upon determining that the connection points are not equivalent reporting the pair of constraints as being different constraints.

\* \* \* \* \*